US011775950B2

(12) United States Patent
Fukuizumi et al.

(10) Patent No.: US 11,775,950 B2
(45) Date of Patent: Oct. 3, 2023

(54) CROSS NETWORK AUTHENTICATION METHOD AND SYSTEM

(71) Applicants: SOFTBANK CORP., Tokyo (JP); TBCASOFT, INC., Sunnyvale, CA (US)

(72) Inventors: Takeshi Fukuizumi, Tokyo (JP); Takahiro Asao, Tokyo (JP); Katsuyoshi Noguchi, Tokyo (JP); Masayoshi Yanase, Tokyo (JP); Miki Fukazawa, Tokyo (JP); Daisuke Yamaguchi, Tokyo (JP); Ling Wu, Sunnyvale, CA (US); Yuan-Shiang Chang, Taipei (TW); William Wu, Sunnyvale, CA (US); Brian M Chan, Sunnyvale, CA (US); Chiahsin Li, Sunnyvale, CA (US); Huan-Yi Lin, Huntington Beach, CA (US)

(73) Assignees: SOFTBANK CORP., Tokyo (JP); TBCASOFT, INC., Sunnyvale, CA (US)

( * ) Notice: Subject to any disclaimer, the term of this patent is extended or adjusted under 35 U.S.C. 154(b) by 125 days.

(21) Appl. No.: 16/629,958

(22) PCT Filed: Jul. 12, 2018

(86) PCT No.: PCT/US2018/041717
§ 371 (c)(1),
(2) Date: Jan. 10, 2020

(87) PCT Pub. No.: WO2019/014399
PCT Pub. Date: Jan. 17, 2019

(65) Prior Publication Data
US 2021/0150498 A1 May 20, 2021

Related U.S. Application Data

(60) Provisional application No. 62/531,911, filed on Jul. 13, 2017, provisional application No. 62/635,550, filed on Feb. 27, 2018.

(51) Int. Cl.
*G06Q 20/16* (2012.01)
*G06Q 20/04* (2012.01)
(Continued)

(52) U.S. Cl.
CPC ............. *G06Q 20/16* (2013.01); *G06Q 20/04* (2013.01); *G06Q 20/085* (2013.01);
(Continued)

(58) Field of Classification Search
None
See application file for complete search history.

(56) References Cited

U.S. PATENT DOCUMENTS 10,902,405 B1 * 1/2021 Maeng ............... G06Q 20/3224
2001/0013019 A1 8/2001 Sugiyama et al.
(Continued)

FOREIGN PATENT DOCUMENTS

KR 101628624 B1 6/2016
WO 2007037008 A1 4/2007
(Continued)

OTHER PUBLICATIONS

International Search Report and Written Opinion dated Sep. 12, 2018 in International Patent Application No. PCT/US2018/041717, filed on Jul. 12, 2018.
(Continued)

*Primary Examiner* — David P Sharvin
(74) *Attorney, Agent, or Firm* — Huan Yi Lin

(57) ABSTRACT

The described embodiments concern one or more methods, systems, apparatuses, and computer readable mediums storing processor-executable process steps to authenticate mobile subscribers for using a foreign application when they are outside of their home telecom carrier's mobile network zone ("foreign zone"). A mobile subscriber can be authenticated through data roaming service, voice roaming service,
(Continued)

and/or WiFi service. After cross network authentication, a mobile subscriber can use the foreign application to provide the same or similar services in a foreign zone, such as foreign country, through the home services in connection with the subscriber's home telecom carrier in a similar manner like he/she can use in his/her home zone, such as home country.

12 Claims, 7 Drawing Sheets

(51) Int. Cl.
    *G06Q 20/08*     (2012.01)
    *G06Q 20/32*     (2012.01)
    *G06Q 20/36*     (2012.01)
    *G06Q 20/38*     (2012.01)

(52) U.S. Cl.
    CPC ....... *G06Q 20/325* (2013.01); *G06Q 20/3221* (2013.01); *G06Q 20/3224* (2013.01); *G06Q 20/3674* (2013.01); *G06Q 20/38* (2013.01)

(56) References Cited

U.S. PATENT DOCUMENTS

2005/0222961 A1* 10/2005 Staib .................. H04M 1/0254
                                                                                                                     705/64
2012/0100832 A1     4/2012   Mao et al.
2013/0054336 A1     2/2013   Graylin

FOREIGN PATENT DOCUMENTS

WO         2008026047 A2     3/2008
WO     WO-2008026047 A2 *   3/2008   ............. H04W 8/12
WO         2013056104 A1     4/2013

OTHER PUBLICATIONS

European Search Report dated Mar. 26, 2021 in a counterpart European Application No. 18831979.2, filed on Jul. 12, 2018.
Office Action of European counterpart application No. 18831979.2 dated May 12, 2022.
Office Action of Japan counterpart application No. 2020-500864 dated Aug. 2, 2022.
Office Action of Singapore counterpart application No. 11202000243V dated Jul. 7, 2022.

* cited by examiner

CROSS NETWORK AUTHENTICATION METHOD AND SYSTEM

BACKGROUND OF THE INVENTION

Related Application

The invention relates to cross network authentication, and more particularly related to authenticating mobile subscribers for using foreign applications when they travel outside of their home telecom carrier's mobile network zone.

Description of Related Art

People travel more often than before for business, vacation, and other purposes. While people travel, they usually bring their mobile device with them and desire to use the same or similar services on their mobile device available at their home carrier's mobile network zone ("home zone"). A telecom carrier usually provides mobile network service throughout its home country but in some situation, the telecom carrier may provide mobile network service only at a portion of its home country ("home zone"). Thus, services provided in connection with home telecom carriers ("home services") generally are not available in foreign countries or foreign zones where their home telecom carrier's mobile network does not cover. Problems arise when mobile subscribers ("subscribers") traveling to foreign countries or foreign zones want to use such home services, because foreign service providers cannot authenticate mobile subscribers and then approve transactions or other services.

For example, when a mobile subscriber wants to make a mobile payment at a foreign (local) merchant store, the foreign (local) merchant has to authenticate the mobile subscriber in a real time manner before it can validate and accept the payment. Foreign (local) merchants generally work with foreign (local) service provider to enable mobile payments from customers' foreign (local) virtual wallets and do not accept mobile payments from the mobile subscribers' home virtual wallet associated with their home telecom carrier. Conventionally, the mobile subscribers have to obtain a foreign (local) mobile device number and create a foreign (local) virtual wallet, in order to use mobile payments in foreign countries (or zones). Even if the subscribers overcome difficulties and challenges to establish a foreign virtual wallet, the process of transferring money, via traditional financial service providers such as banks, from their home country to the foreign virtual wallet can be troublesome and time consuming. Thus, mobile subscribers cannot use their home virtual wallet to make mobile payments while traveling. And likewise, foreign (local) merchants lose potential business from mobile subscribers who travel to foreign countries (or zones).

Currently, people travelling to foreign countries (or zones) have to change their consumption behavior, or take actions to overcome difficulties and challenges to engage with foreign (local) service providers in foreign countries (or zones). This invention intends to solve the problem by providing cross network/zone authentication method and system and, thus, enables various kinds of home services in foreign countries (or zones) by using foreign applications, such as mobile payments and digital property transfers in a foreign country (or zone) by using a foreign virtual wallet via a home virtual wallet.

DETAILED DESCRIPTION OF PREFERRED EMBODIMENTS

Figure 1:
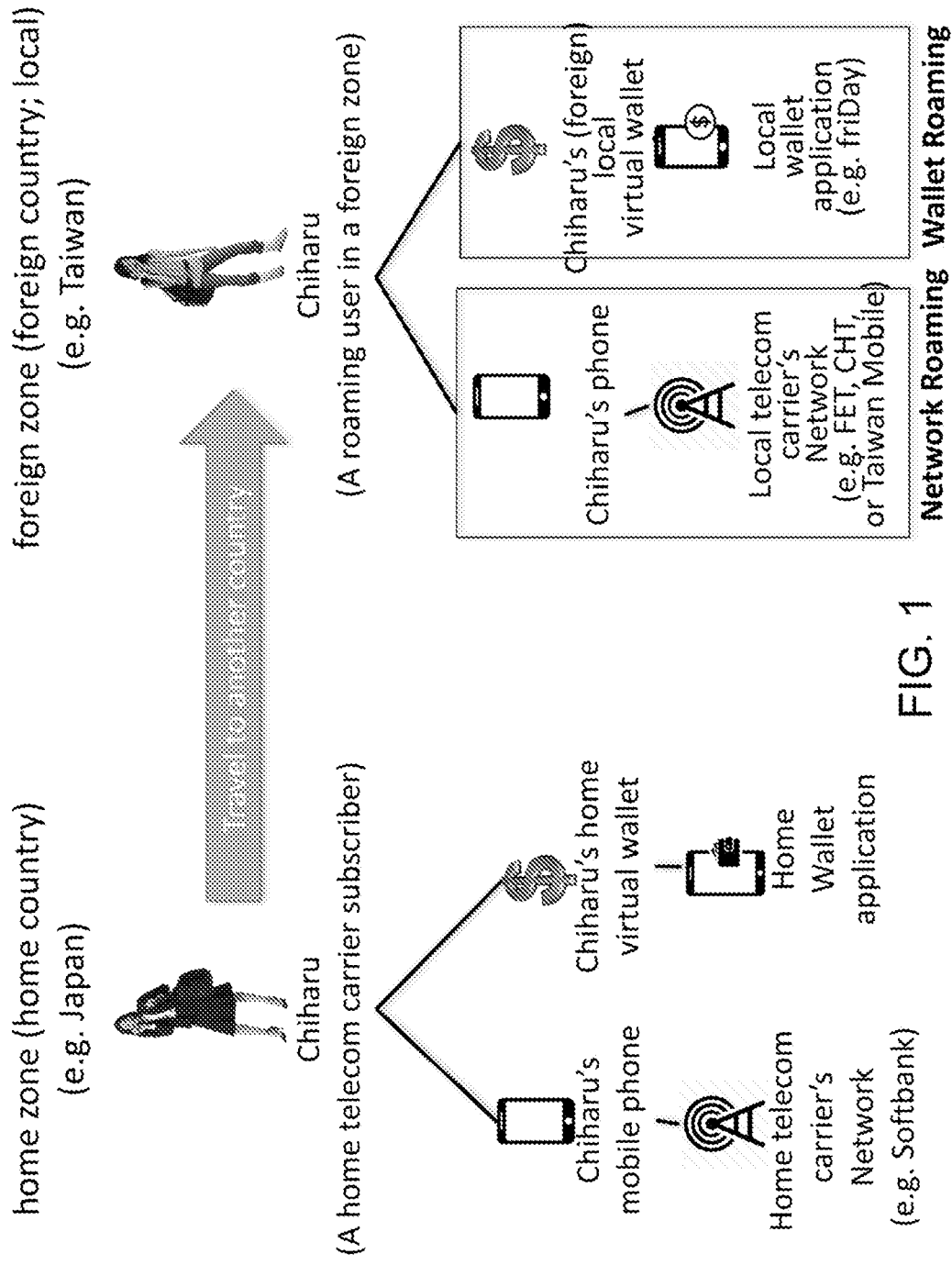
FIG. 1 is a diagram illustrating a mobile subscriber (Chiharu) traveling to a foreign country and trying to use her home virtual wallet in a foreign country through wallet roaming.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section. The term wallet is used interchangeably with virtual wallet. The term charrier authentication is used interchangeably with subscriber authentication. The term application is referred to as app. The term foreign wallet application is one type of foreign applications. The term foreign wallet server is one type of foreign application servers.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The described embodiments concern one or more methods, systems, apparatuses, and computer readable mediums storing processor-executable process steps to authenticate mobile subscribers for using a foreign application when they are outside of their home telecom carrier's mobile network zone ("foreign zone"). A mobile subscriber subscribes a mobile device number and service from a home telecom carrier to be used with a mobile device, which can include all kinds of portable devices having telecommunication function, such as mobile phones and tablets. In first embodiment, a mobile subscriber can be authenticated to use a foreign application through data roaming service. In second embodiment, a mobile subscriber can be authenticated to use a foreign application through voice roaming service. In third embodiment, a mobile subscriber can be authenticated to use a foreign application through WiFi service. After cross network authentication, a mobile subscriber can use the foreign application to provide the same or similar services in a foreign zone, such as foreign country, through the home services in connection with the subscriber's home telecom carrier in a similar manner like he/she can use in his/her home zone, such as home country. The cross network authentication can be employed by many different kinds of applications that provide services in connection with telecom carriers. In one embodiment, after cross network authentication, a mobile subscriber who has a home virtual wallet associated with his/her home telecom carrier, when travelling to a foreign zone, such as foreign country, can use his/her home virtual wallet to pay for transactions (mobile payment) in foreign (local) stores through a foreign (local) virtual wallet application in the foreign zone. This embodiment is referred to as wallet roaming to mean that a home virtual wallet can be used for mobile payments through a foreign virtual wallet in a foreign zone. For the wallet roaming, in one embodiment, the transactions are recorded and cleared in a distributed ledger by a distributed transaction consensus network utilizing cryptographic technology. The distributed ledger can use blockchain data format in one embodiment. With respect to the transaction recording and clearance between virtual wallets associated with different telecom carriers, International Patent Application PCT/US17/12635, filed on Jan. 6, 2017, titled "DIGITAL PROPERTY MANAGEMENT ON A DISTRIBUTED TRANSACTION CONSENSUS NETWORK", is incorporated herein by reference.

FIG. 1 describes an embodiment of mobile subscriber authentication in wallet roaming applications. In this embodiment, Chiharu, a mobile subscriber of Softbank Corp. (a Japanese telecom carrier) ("Softbank"), travels from Japan (Chiharu's home zone/country) to Taiwan (Chiharu's foreign zone/country). Softbank is Chiharu's home telecom carrier for voice and data services. Chiharu also subscribes home virtual wallet service from Softbank. At a merchant store in Japan, Chiharu can use Softbank's virtual wallet application ("app") ("home carrier's wallet app") installed on her mobile device to make mobile payments from her home virtual wallet to a Japanese merchant's virtual wallet. After Chiharu arrives in Taiwan, Chiharu can activate voice or data roaming service to connect her mobile device to one of three major telecom carriers in Taiwan, FarEasTone Telecommunication ("FET"), Chunghwa Telecom Co., Ltd. ("CHT"), or Taiwan Mobile Co., Ltd. ("Taiwan Mobile"), based on either the reception of foreign (local) telecom carriers or the pre-determined foreign (local) telecom carriers. During the process of establishing the voice or data roaming, the foreign (local) telecom carrier would be able to identify the home telecom carrier and receive the mobile network level authentication of the mobile subscriber from his/her home telecom carrier. After voice or data roaming is established, Chiharu can use the same mobile device to make/receive phone calls or download/upload data via one of the Taiwan telecom carriers. In addition, Chiharu can use WiFi to connect to internet for data services.

In order to implement wallet roaming (or other service application roaming), the home virtual wallet and the foreign virtual wallet have to be able to conduct digital property transactions with each other, directly or indirectly, through one or more distributed transaction consensus networks. Given Softbank and FET are both members of a distributed transaction consensus network, Chiharu can then roam her home virtual wallet associated with Softbank to a foreign virtual wallet associated with FET. Chiharu has to first download foreign (local) virtual wallet application ("app") from FET regardless of the foreign (local) telecom carrier Chiharu uses for data roaming. In other words, Chiharu can use CHT for data roaming but still use FET for wallet roaming. After Softbank authenticates Chiharu to use FET virtual wallet application, Chiharu can then use her home virtual wallet associated with Softbank to make mobile payments at merchant stores in Taiwan, which accept payments from FET virtual wallet but do not accept payments from Chiharu's Japanese virtual wallet associated with Softbank.

For a home telecom carrier to complete mobile subscriber authentication to use a foreign application, such as a virtual wallet application, the first step is that the foreign application (or the foreign application server), has to identify the home telecom carrier from the mobile device which has activated data roaming service or voice roaming service, or used WiFi to access internet. if the foreign application is installed on the mobile device. The second step is for the foreign application (or the foreign application server), such as the foreign virtual wallet application, to receive the authentication of genuineness of the mobile subscriber from his/her home telecom carrier.

Figure 2:
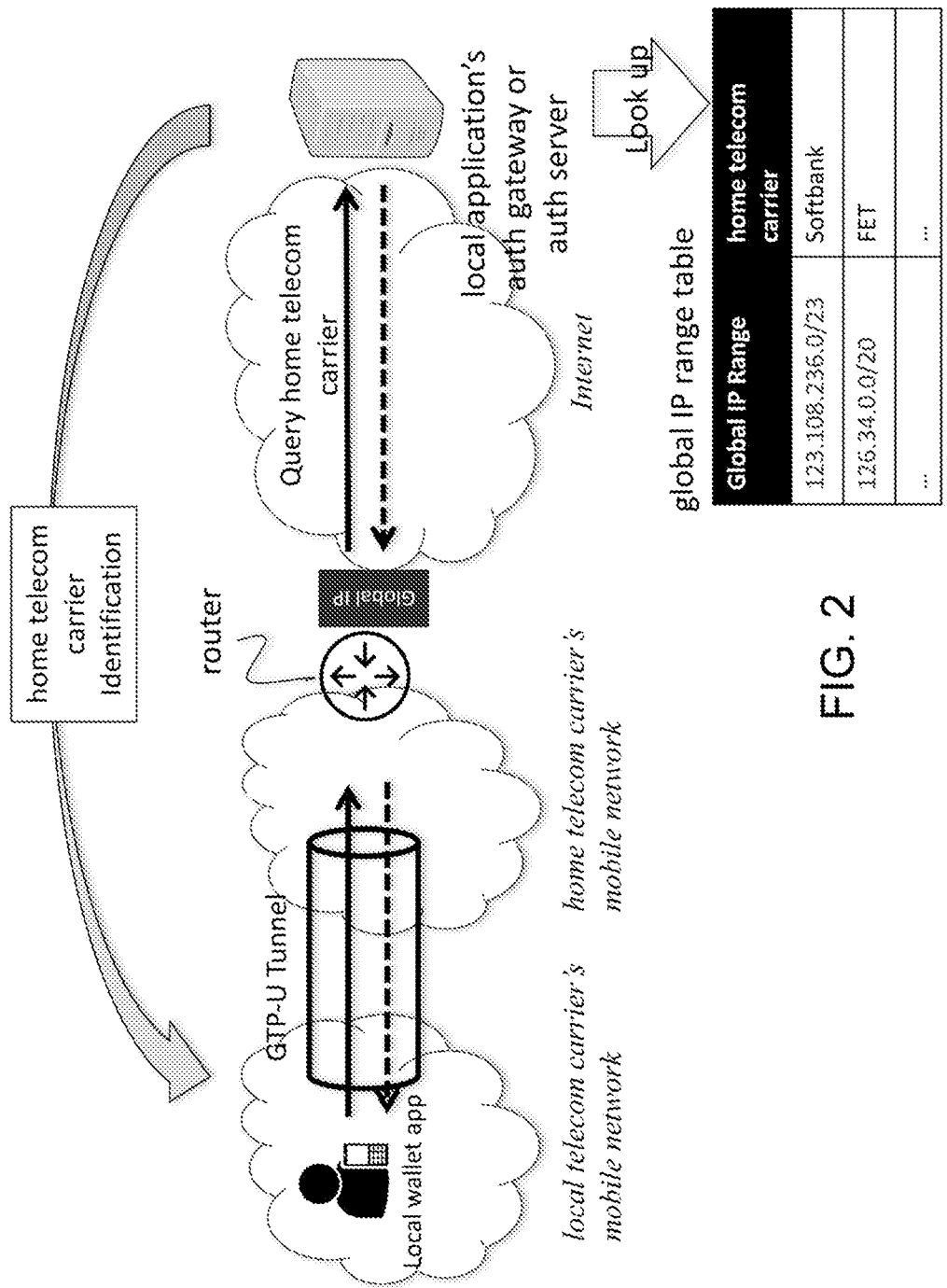
FIG. 2 depicts an embodiment of home telecom carrier identification process through data roaming.

In the first embodiment as shown in FIG. 2, the mobile subscriber ("subscriber") who travels to a foreign zone, such as a foreign country, has activated data roaming service so that the connection between the foreign (local) telecom carrier's mobile network and the home telecom carrier's mobile network is established through GPRS Tunneling Protocol User Plane (GTP-U) tunnel or similar service. Then, the mobile subscriber can begin to download the foreign (local) application in Taiwan, e.g. friDay Wallet which is FET's virtual wallet application. The data roaming service provider need not be FET, the foreign telecom carrier with which the foreign wallet application is associated. During this download process, all data packets would be routed from foreign (local) telecom carrier's mobile network, e.g. FET or CHT or Taiwan Mobile, to home telecom carrier's mobile network, e.g. Softbank, through a GTP-U tunnel, and then be sent out to internet. Once the subscriber launches the foreign (local) virtual wallet application, e.g. friDay Wallet App, such foreign virtual wallet application will notice that the mobile device number is not a local one and will send a request to foreign (local) application's authentication gateway ("AG") querying for the identity of subscriber's home telecom carrier. Following the same route, the data packets of such a query message will be routed from the foreign (local) virtual wallet app on the subscriber's mobile device to foreign (local) telecom carrier's mobile network, e.g, FET, CHT or Taiwan Mobile in Taiwan, and then through GTP-U tunnel to home telecom carrier's mobile network, e.g. Softbank in Japan, and then through a home telecom carrier's router to internet, and eventually arrive at foreign (local) application's authentication gateway (AG) in Taiwan. When the data packets come through the home telecom carrier's router to internet, the source IP address of these data packets of the query message is translated from a private IP address (only recognized within mobile networks) to a global IP address (recognized on internet). After such network address translation ("NAT"), the data packets will carry one of the global IP addresses assigned to the home telecom carrier, e.g. Softbank. Thus, the foreign (local) application's AG can look up a global IP range table to determine the identity of the subscriber's home telecom carrier. For example, if the global IP address of the query message's data packets received by the foreign (local) application's AG is 123.108.236.0, after looking up to the global IP range table, the foreign (local) application's AG determines that the subscriber's home telecom carrier is Softbank and sends such information back to the foreign (local) application, e.g. FET's friDay Wallet App. Alternatively, a foreign (local) application's authentication server ("AS") can be configured to perform the above function provided by the foreign (local) application's authentication gateway in FIG. 2.

Figure 3:
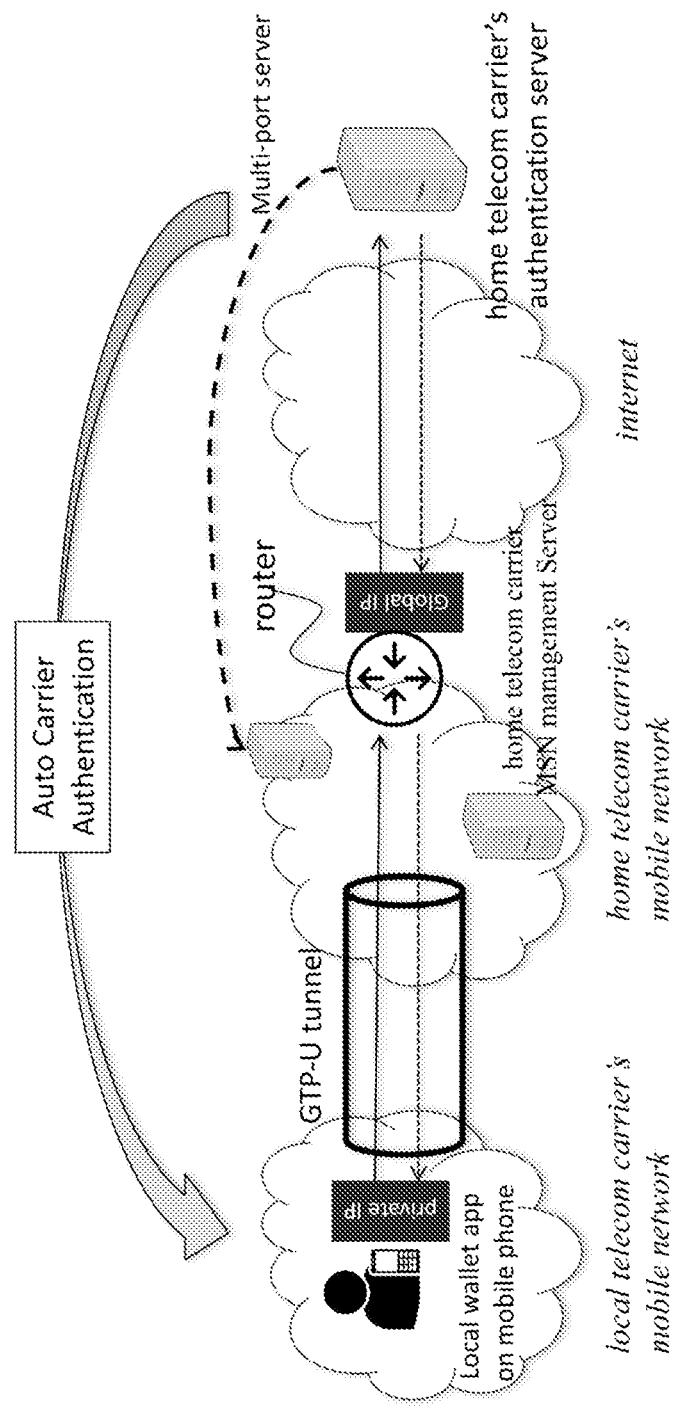
FIG. 3 depicts an embodiment of subscriber authentication process through data roaming.

After identification of the subscriber's home telecom carrier, the second step is for the foreign application to receive the authentication of genuineness of the mobile subscriber. As shown in FIG. 3, the mobile subscriber authentication can be completed by the communication between foreign (local) telecom carrier and home telecom carrier, more specifically, among the foreign (local) wallet application, foreign (local) wallet application server, home telecom carrier's authentication server ("AS") and home telecom carrier's mobile subscriber number ("MSN") management server ("MS"), without subscriber entering user ID and password. As a result, this process is also referred to as auto carrier authentication. When the subscriber turns on data roaming service, the home telecom carrier will assign a private IP address to be used by the subscriber's mobile device to transmit data packets within carriers' mobile network and GTP-U tunnel. Thus, through data roaming, subscriber's mobile device, while located in a foreign country (or zone) can have data connection to home telecom carrier's internal servers, such as home carrier's MSN management server and AS, in home telecom carrier's mobile network using the private IP address as the source IP address of the data packets.

In addition, as shown in FIG. 3, home telecom carrier's AS is a multi-port server, which can connect to both the home telecom carrier's mobile network and the internet at the same time. Thus, the same home telecom carrier's AS is depicted twice in FIG. 3, which are connected by a dashed line, one located inside the home carrier's mobile network and the other connected via internet. Under the network architecture shown in FIG. 3, subscriber authentication can be completed automatically for data roaming users without their entering user ID and password.

Figure 4:
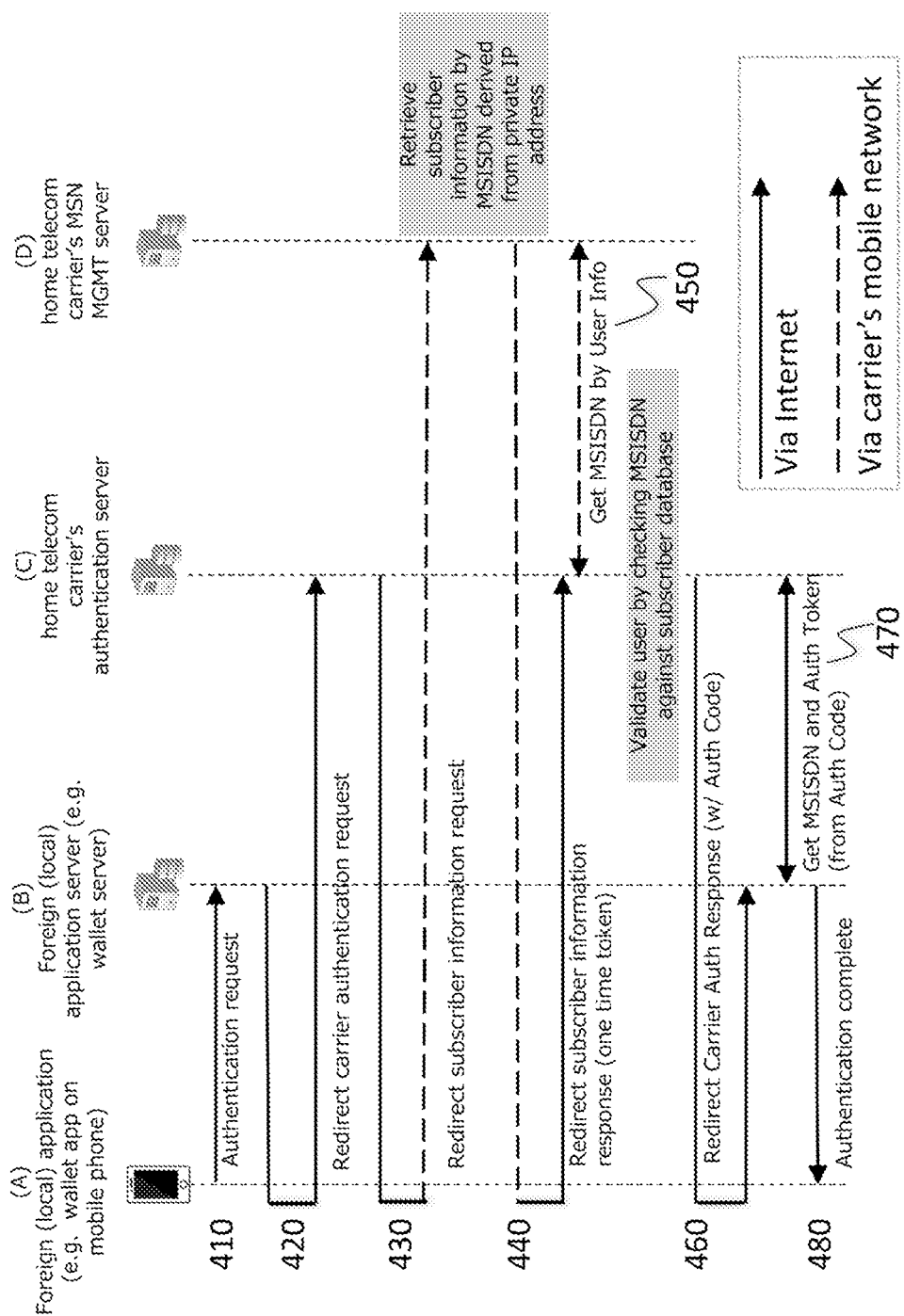
FIG. 4 illustrates an embodiment of data communication flow to achieve subscriber authentication through data roaming.

FIG. 4 depicts one embodiment of the data communication flow among the foreign (local) wallet application, foreign (local) wallet server, home telecom carrier's authentication server ("AS") and home telecom carrier's MSN management server ("MS"), in order to complete the second step of subscriber authentication. At step 410, the local virtual wallet app sends an authentication request to the local wallet server via internet, which can recognize the subscriber as a data roaming user who needs authentication from his/her home telecom carrier's AS. As a result, at step 420, the local wallet server redirects via internet a subscriber authentication request to home telecom carrier's AS. At step 430, upon receiving the subscriber authentication request, home telecom carrier's AS needs subscriber's information to verify his/her identity and, thus, redirects a subscriber information request via carrier's mobile network to home telecom carrier's MSN MS. At step 440, upon receiving the subscriber information request, home telecom carrier's MSN MS can retrieve subscriber information by Mobile Subscriber International Subscriber Directory Number ("MSISDN") derived from private IP address of the data packets. In one embodiment, home telecom carrier's MSN MS assigns a one time token for subscriber information. As a result, in response to the subscriber information request, home telecom carrier's MSN MS redirects the subscriber information, e.g. one time token, via carrier's mobile network and then internet, to home telecom carrier's AS for validation. At step 450, upon receiving the subscriber information, home telecom carrier's AS independently requests and receives via carrier's mobile network the subscriber's MSISDN from the home telecom carrier's MSN MS by submitting the subscriber's information. Then, the home telecom carrier's AS checks the received subscriber's MSISDN against its subscriber's database to validate the subscriber. At step 460, the home telecom carrier's AS redirects via internet a subscriber authentication response (with an authentication code) to the local wallet server. At step 470, local wallet server independently requests and receives via internet the subscriber's MSISDN and an authentication token from home telecom carrier's AS by submitting the subscriber authentication response (with an authentication code). At step 480, the local wallet server returns the authentication token to the local wallet application to complete the authentication process. Afterwards, the local wallet application can use the authentication token to contact home telecom carrier's authentication gateway.

For the subscriber's convenience, through the steps depicted in FIG. 4, the subscriber authentication can be completed automatically without entering user ID and password. However, as an alternative, after the subscriber activates the data roaming service, the subscriber can still be requested to enter user ID and password that are used to set up the account with his/her home virtual wallet for the security reason.

Figure 5:
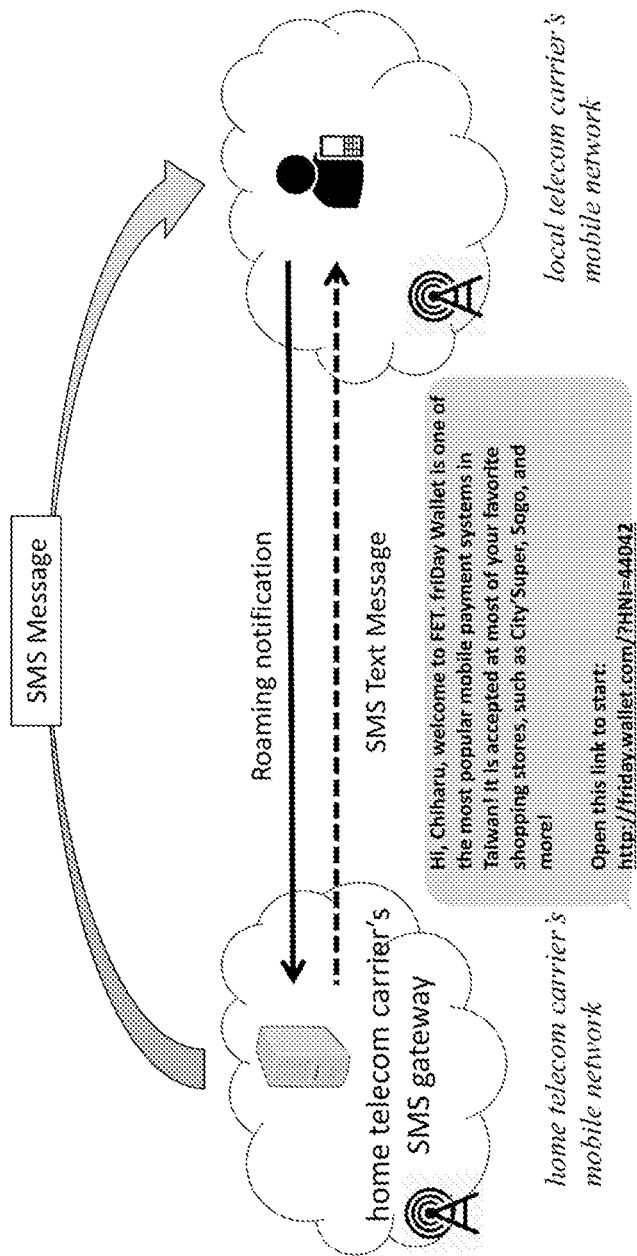
FIG. 5 depicts an embodiment of home telecom carrier identification through voice roaming.

In the second embodiment as shown in FIG. 5, the mobile subscriber who travels to a foreign country (or zone) has activated voice roaming service, rather than data roaming service, to connect his/her mobile device with the home telecom carrier through the foreign (or local) telecom carrier's mobile network. The home telecom carrier will deliver to the subscriber's mobile device a message via the short message service (SMS) or similar services. The SMS message may include a link to activate foreign (local) wallet application with home telecom carrier's home network identifier ("HNI") code passing to the application. With the HNI code, foreign (local) wallet application can acquire the identify of home telecom carrier from existing mobile network.

Figure 6:
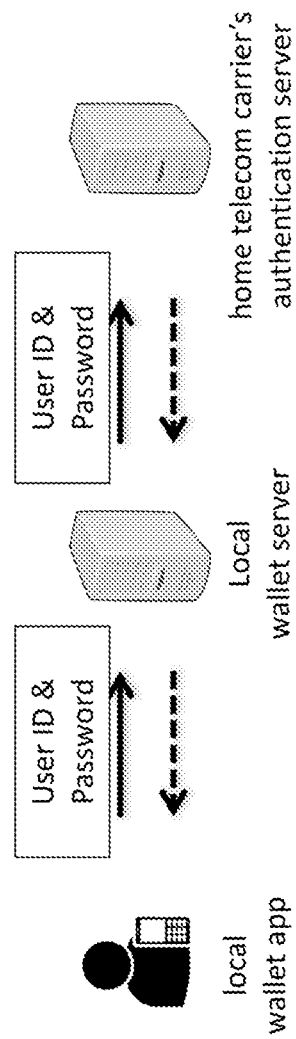
FIG. 6 illustrates an embodiment of describer authentication process through voice roaming.

After the home telecom carrier is identified, the authentication can be completed by user entering user ID and password that are used to set up the account with his/her home virtual wallet. As shown in FIG. 6, the foreign (local) wallet application requests the subscriber to enter his/her user ID and password, and then sends such information to the foreign (local) wallet server, which then forwards it to home telecom carrier's authentication server ("AS") for authentication. After home telecom carrier's AS confirms the user ID and password, it will send an authentication token back to foreign (local) wallet server, which will send the authentication token back to the foreign (local) wallet application to complete the authentication process.

In the third embodiment, the mobile subscriber who travels to a foreign country (or zone) has only WiFi service, rather than data or voice roaming service, to connect his/her mobile device to the internet. Without data and voice roaming service, the subscriber has to identify his/her home telecom carrier, and enter user ID and password that are used to set up the account with his/her home virtual wallet to complete subscriber authentication.

After subscriber authentication process is completed, the foreign (local) wallet application recognizes the subscriber and allows him/her to make mobile payments at foreign (local) merchant stores under rules the same or similar to a foreign (local) user. The subscriber may have several methods to pay the bill incurred by the mobile payments in foreign (local) merchant stores. First, depending on the rules, the subscriber may be able to directly deposit money into his/her foreign (local) virtual wallet account, if there is one, before or after transaction to pay the bill from foreign (local) merchant stores. Second, the subscriber may be able to wire money from his/her home bank account or home virtual wallet to his/her foreign (local) virtual wallet account to pay the bill. Third, the subscriber may be able to register his/her home issued credit card with the foreign (local) wallet account and pay the credit card bill. Fourth, the subscriber may be able to pay his/her home telecom carrier which in turn will pay the foreign (local) telecom carrier with which the foreign virtual wallet is associated, which in turn will pay the bill from foreign (local) merchant stores. None of these methods can allow the foreign (local) merchants to receive the payment in a real time manner, except for advanced direct cash deposit into the foreign (local) virtual wallet account which is inconvenient because the subscriber has to carry a large amount of cash for travelling.

In addition to the above payment methods, the subscriber can complete the payment remittance, including clearance and settlement, from the subscriber's home virtual wallet associated with his/her home telecom carrier to (1) the subscriber's foreign (local) virtual wallet associated with a foreign (local) telecom carrier, if there is one, (2) foreign (local) merchant's virtual wallet associated with a foreign (local) telecom carrier, if there is one, or (3) foreign (local) telecom carrier's own virtual wallet, such as FET's virtual wallet, if there is one, from which such remittance will be further transmitted to foreign (local) merchant's account. The above remittance between virtual wallets can be completed in a real time manner, based on cryptographic technology in a distributed transaction consensus network, in one embodiment, by applying the method and system described in the International Patent Application Number PCT/US17/12635 filed on Jan. 6, 2017, entitled "Digital Property Management On A Distributed Transaction Consensus Network."

Figure 7:
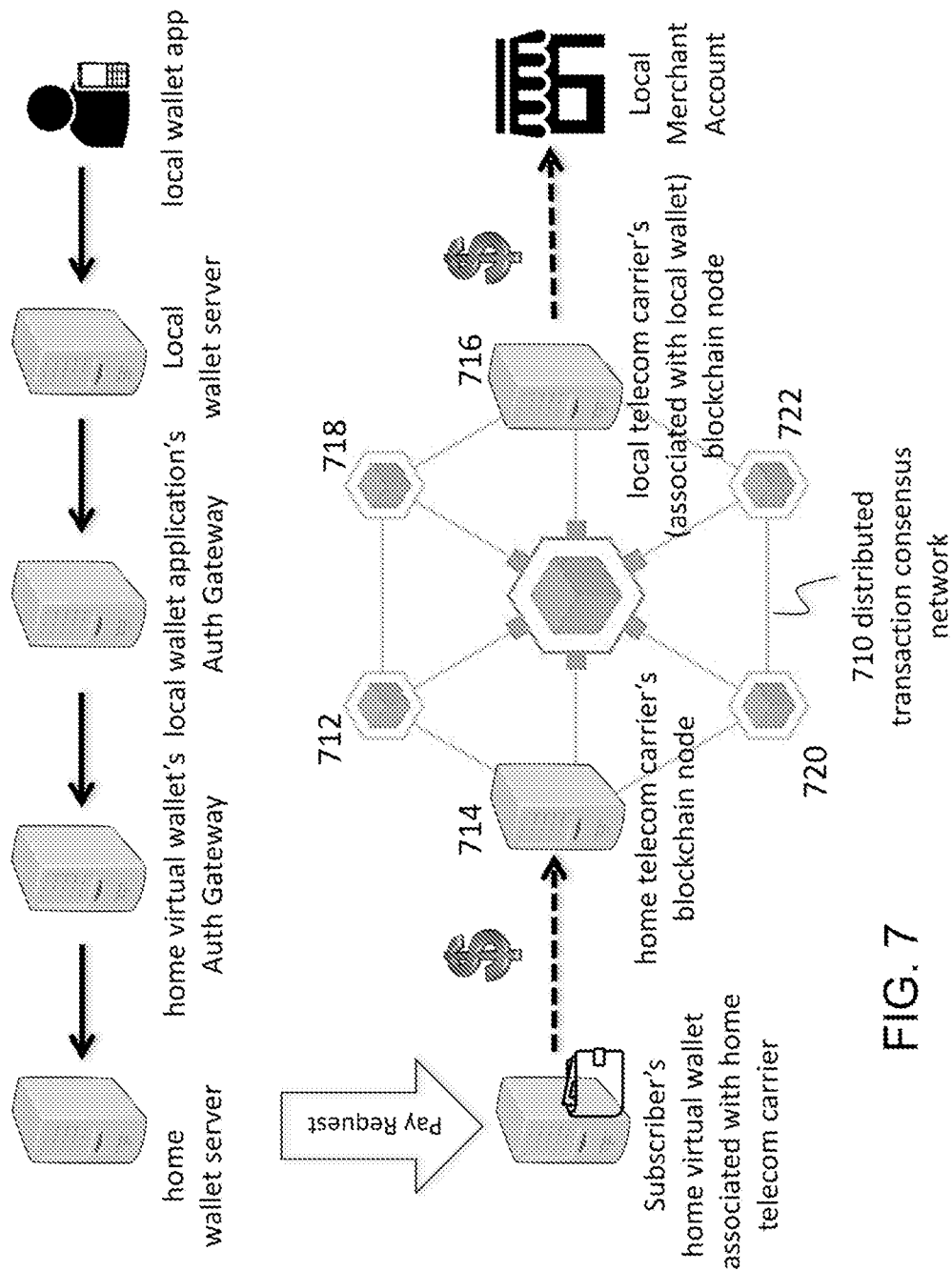
FIG. 7 illustrates an embodiment of the mobile payment application via virtual wallets, after cross network authentication, by employing a distributed transaction consensus network.

As shown in FIG. 7, when the subscriber makes a mobile payment using his/her mobile device at a foreign (local) merchant store, the foreign (local) wallet application initiates a payment request and sends it to the foreign (local) wallet server, which passes it to foreign (local) wallet application's authentication gateway ("AG"), which then re-direct the payment request to home virtual wallet's AG, which passes it to home wallet server, which then initiates a remittance request through the subscriber's home virtual wallet. For security reason, in one embodiment, the subscriber will need to approve the remittance request. The remittance transaction is delivered to a distributed transaction consensus network ("TBCA Network") with multiple nodes where each of the home telecom carrier and the foreign (local) telecom carrier with which the foreign virtual wallet is associated is an individual node on this network. The remittance request from home wallet server is processed as a P2P remittance from subscriber's home virtual wallet to one of three virtual wallets, depending on the system design, which are (1) the subscriber's foreign (local) virtual wallet associated with a foreign (local) telecom carrier, (2) foreign (local) merchant's virtual wallet associated with a foreign (local) telecom carrier, or (3) foreign (local) telecom carrier's own virtual wallet, from which such remittance will be further transmitted to foreign (local) merchant's account. In one embodiment, the distributed transaction consensus network applies blockchain technology as described in the International Patent Application Number PCT/US17/12635 filed on Jan. 6, 2017

FIG. 7 depicts an embodiment of a distributed transaction consensus network 710, referred to as TBCA (The Block-Chain Alliance) Network, using cryptographic technology, which is implemented to manage digital properties in virtual wallets associated with telecom carriers with which payers and payees register their mobile subscription numbers. TBCA Network 710 comprises a plurality of nodes, including an administrator 712, telecom carriers (verifiers or digital property issuers) 714, 716, and miners 718, 720, 722. Each node usually comprises a processor to perform calculations and execute programs; a memory to store software, programs, and data; a display to communicate with users; an input/output component to communicate with users and other devices, and a network component to connect with network via wiring or wireless channels.

The administrator 712, referred to as TBCA in this disclosure, sets rules and manages the TBCA Network 710. The administrator 712 can issue digital fee tokens, referred to as T coin ($T) in this embodiment. The administrator 712 has a virtual treasury (not shown) to store digital fee tokens issued by itself or digital properties issued by other nodes. A virtual treasury is a special type of virtual wallets. The administrator 712 can admit a node to join the distributed transaction consensus network 710 (TBCA Network) and become a member of the network. In addition, the administrator 712 (TBCA) can manage miners, including designate a single active miner, determine a sequence of miners to be active, and set the rules for the miners to check and support each other to prevent the miners from malfunction.

A miner 718, 720, 722 can create transaction records to record validated transactions in a distributed ledger (open to a member/node of TBCA Network 710). In exchange for the service a miner provides, the miner may receive a reward, such as T coin issued by the administrator 712 (TBCA) and/or digital properties issued by telecom carriers (digital property issuers), which can be stored in a miner's virtual treasury (not shown). A distributed ledger can be a digital property database or data structure that can be shared across a distributed transaction consensus network of multiple nodes in various sites, geographies or institutions. In an embodiment, a blockchain data structure is used for a distributed ledger. Each block is identified by a block hash, made by hashing the block header twice through the SHA256 cryptographic algorithm. In addition, each block is referenced back to a previous block, known as the parent block, through a "previous block hash" field in the block header. Thus, the sequence of hashes links each block to its parent to create a chain going back all the way to the first block ever created. As the blocks pile on top of each other, it becomes exponentially harder to reverse the transactions. Therefore, transactions recorded in the blocks become more and more trusted over the time. Depending on the size of the block and transactions, an average block can contain several hundreds of transactions. A complete and up-to-date distributed ledger is stored in a database (or a file) of the administrator, digital property issuers, miners, and other nodes admitted by the administrator 710 to store such ledger ("full node"). Some nodes can select to store only a portion of such ledger. A miner can create a new block to record validated transactions, and then propagate the new block to other nodes of the network. However, a distributed ledger can use any other data structure known to people with ordinary skill in the art.

In one embodiment, transactions between virtual wallets, including deposit to, remittance between, and withdrawal from virtual wallets, are recorded by a distributed ledger. A distributed ledger is essentially a digital property database or data structure that can be shared across a distributed transaction consensus network of multiple nodes in various sites, geographies or institutions. All nodes within the network can have their own identical copy of the ledger. Any changes to the ledger are reflected in all copies in minutes, or in some cases, seconds. The security and accuracy of the digital properties stored in the ledger are maintained cryptographically through the use of keys and signatures to control who can do what within the distributed ledger. In an embodiment, a blockchain data structure is used for a distributed ledger.

It will be apparent to those skilled in the art that various modification and variations can be made in the digital property management method and related apparatus of the present invention without departing from the spirit or scope of the invention. Thus, it is intended that the present invention cover modifications and variations that come within the scope of the appended claims and their equivalents.

What is claimed is:

1. A method of authenticating a mobile device at a foreign zone, by a home telecom carrier associated with the mobile device, to use a foreign application installed on the mobile device and supported by a foreign application server in a network of a foreign telecom carrier in communication with a network of the home telecom carrier, the method comprising:
    (a) establishing a data transmission connection between the mobile device and the network of the home telecom carrier;
    (b) identifying through the foreign application or a foreign authentication server in the network of the foreign telecom carrier the home telecom carrier by checking a global IP (Internet Protocol) address of the home telecom carrier generated by the network of home telecom carrier; and
    (c) receiving a subscriber authentication token from the network of the home telecom carrier through the foreign application, the foreign application server, and a home authentication server in the network of the home telecom carrier, after the home telecom carrier is identified and the mobile device is authenticated.

2. The method of claim 1, wherein, at step (b), the global IP address is translated by the network of the home telecom carrier from a data packet sent originally from the mobile device located at a foreign zone to query an identify of the home telecom carrier.

3. The method of claim 2, wherein the data packet is sent originally from the mobile device, through a foreign telecom carrier's mobile network and a GPRS tunneling protocol user plane tunnel, to a home telecom carrier's mobile network, and then sent to an internet after the global IP address is translated.

4. The method of claim 1, wherein, at step (a), the data transmission connection between the mobile device and the home telecom carrier is established by data roaming.

5. The method of claim 1, wherein step (c) comprises:
    (c1) sending an authentication request, by the foreign application or the foreign application server, to the home authentication server;
    (c2) receiving a Mobile Subscriber International Subscriber Directory Number ("MSISDN") by the home authentication server to validate the subscriber by checking the MSISDN against a subscriber database; and
    (c3) sending the subscriber authentication token, by the home authentication server, to the foreign application or the foreign application server.

6. The method of claim 5, wherein step (c1) comprises:
    (c11) sending an authentication request, by the foreign application, to the foreign application server; and
    (c12) receiving the authentication request, by the home authentication server, from the foreign application server, via redirection of the foreign application.

7. The method of claim 5, wherein step (c2) comprises:
    (c21) sending a subscriber information request, by the home authentication server, to a home telecom carrier's mobile subscriber number ("MSN") management server ("MS"), via redirection of the foreign application;
    (c22) sending a subscriber information, by the home telecom carrier's MSN MS, to the home authentication server, via redirection of the foreign application;
    (c23) sending the subscriber information, by the home authentication server, directly to the home telecom carrier's MSN MS;
    (c24) receiving the MSISDN, by the home authentication server, directly from the home telecom carrier's MSN MS; and
    (c25) validating the subscriber, by the home authentication server checking the MSISDN against the subscriber database.

8. The method of claim 5, wherein step (c3) comprises:
    (c31) sending a subscriber authentication response with an authentication code, by the home authentication server, to the foreign application server, via redirection of the foreign application;
    (c32) sending the subscriber authentication response with the authentication code, by the foreign application server, to the home authentication server;
    (c33) receiving the MSISDN and the authentication token, by the foreign application server, directly from the home authentication server; and
    (c34) sending the authentication token, by the foreign application server, to the foreign application.

9. The method of claim 1, wherein the foreign application is a foreign wallet application and the foreign application server is a foreign wallet server.

10. The method of claim 9, further comprising:
    (d) receiving a remittance request, by the foreign wallet server, from the foreign wallet application installed on the mobile device located at the foreign zone;
    (e) receiving the remittance request, by a home wallet server, from the foreign wallet server;
    (f) submitting the remittance request to a home telecom carrier's node of a distributed transaction consensus network to transfer digital property from a home virtual wallet to a target foreign wallet; and
    (g) recording the remittance in a distributed ledger.

11. The method of claim 10, wherein, at step (e), the remittance request is sent by the foreign wallet server, to the home wallet server, via a foreign wallet application's authentication gateway and a home telecom carrier's authentication gateway.

12. The method of claim 10, wherein, at step (g), the distributed ledger has a blockchain data structure.

* * * * *